US011028328B2

(12) United States Patent
Alshareef et al.

(10) Patent No.: US 11,028,328 B2
(45) Date of Patent: Jun. 8, 2021

(54) SYSTEMS AND PROCESSES FOR CATALYTIC REFORMING OF A HYDROCARBON FEED STOCK

(71) Applicant: Saudi Arabian Oil Company, Dhahran (SA)

(72) Inventors: Ali H. Alshareef, Qatif (SA); Mohammad A. Al-Rebh, Qatif (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/594,275

(22) Filed: Oct. 7, 2019

(65) Prior Publication Data
US 2021/0102128 A1  Apr. 8, 2021

(51) Int. Cl.
| C10G 59/02 | (2006.01) |
| C10G 35/06 | (2006.01) |
| B01J 38/30 | (2006.01) |

(52) U.S. Cl.
CPC .............. *C10G 59/02* (2013.01); *B01J 38/30* (2013.01); *C10G 35/06* (2013.01); *C10G 2300/1044* (2013.01); *C10G 2300/701* (2013.01)

(58) Field of Classification Search
None
See application file for complete search history.

(56) References Cited

U.S. PATENT DOCUMENTS

| 2,198,595 | A | 4/1940 | Amos et al. |
| 3,069,348 | A | 12/1962 | Bergstrom et al. |
| 3,470,090 | A | 9/1969 | Carson |
| 4,110,197 | A | 8/1978 | Herning et al. |
| 4,133,743 | A | 1/1979 | Boret et al. |
| 4,325,806 | A | 4/1982 | Peters |
| 4,325,807 | A | 4/1982 | Peters |

(Continued)

FOREIGN PATENT DOCUMENTS

| CN | 102019211 A | 4/2011 |
| CN | 204111687 U | 1/2015 |

(Continued)

OTHER PUBLICATIONS

International Search Report and Written Opinion dated Jun. 9, 2020 pertaining to International application No. PCT/US2019/068260 filed Dec. 23, 2019, 12 pgs.

(Continued)

*Primary Examiner* — Tam M Nguyen
(74) *Attorney, Agent, or Firm* — Dinsmore & Shohl LLP (57) ABSTRACT

Processes for catalytic reforming of a hydrocarbon feedstock may include contacting the hydrocarbon feedstock with catalyst in a first reforming unit to produce a first effluent and used catalyst. The method may further include passing a portion of the first effluent directly to a second reforming unit and contacting the first effluent with catalyst to produce a second effluent and used catalyst. The method may also include passing a portion of the second effluent directly to a third reforming unit and contacting the second effluent with catalyst to produce a reformate effluent and used catalyst. Additionally, the method may include regenerating at least a portion of the used catalyst to produce regenerated catalyst. The catalysts may each include regenerated catalyst.

20 Claims, 5 Drawing Sheets

(56) References Cited

U.S. PATENT DOCUMENTS

| | | |
|---|---|---|
| 4,498,973 A | 2/1985 | Sikonia et al. |
| 4,576,710 A | 3/1986 | Nongbri et al. |
| 4,724,065 A | 2/1988 | Bartholic et al. |
| 5,211,838 A | 5/1993 | Staubs et al. |
| 5,417,843 A | 5/1995 | Swart et al. |
| 5,935,415 A | 8/1999 | Haizmann et al. |
| 5,958,216 A | 9/1999 | Glover |
| 6,177,002 B1 | 1/2001 | Glover |
| 6,685,892 B1 | 2/2004 | Vora et al. |
| 9,102,881 B2* | 8/2015 | Gajda .................... C10G 59/00 |
| 9,145,528 B2* | 9/2015 | Goodall ................. C10G 65/12 |
| 9,206,362 B2* | 12/2015 | Haizmann .............. C10G 59/00 |
| 2002/0011428 A1 | 1/2002 | Scheuerman |
| 2004/0178119 A1 | 9/2004 | Sanchez et al. |
| 2010/0314288 A1* | 12/2010 | Decoodt ................ C10G 35/12 208/64 |
| 2013/0087482 A1 | 4/2013 | Haizmann et al. |
| 2014/0374313 A1 | 12/2014 | Haizmann et al. |
| 2016/0369179 A1* | 12/2016 | Holmgreen ............ C10G 59/02 |
| 2018/0223196 A1* | 8/2018 | Egolf ..................... C10G 35/12 |
| 2019/0203128 A1* | 7/2019 | McGahee ............. C10G 59/02 |
| 2020/0147573 A1* | 5/2020 | McGahee ............. B01J 8/0438 |

FOREIGN PATENT DOCUMENTS

| | | |
|---|---|---|
| DE | 4100551 A | 7/1991 |
| GB | 1329097 A | 9/1973 |
| GB | 1424244 A | 2/1976 |

OTHER PUBLICATIONS

Gauthier et al. "FCC: Fluidization Phenomena and Technologies" Oil &Gas Science Technology—Rev. IFP, vol. 55 (2000), 21 pgs.

* cited by examiner

SYSTEMS AND PROCESSES FOR CATALYTIC REFORMING OF A HYDROCARBON FEED STOCK

BACKGROUND

Field

The present disclosure relates to systems and processes for processing hydrocarbons and, more specifically, systems and processes for processing hydrocarbons through catalytic reforming to form chemical products.

Technical Background

Hydrocarbon feedstocks with minimal value, such as naphtha, can be converted to valuable chemical products, such as aromatics and "high-octane" fuels, through catalytic reforming. Typical feedstocks contain large concentrations of paraffinic and naphthenic hydrocarbons that must undergo a number of catalytic conversion reactions before the desired chemical products may be obtained. For example, typical catalytic reforming reactions may include dehydrogenation of naphthenes to aromatics, dehydrocyclization of paraffins, isomerization of paraffins and naphthenes, dealkylation of alkylaromatics, hydrocracking of paraffins to light hydrocarbons, or other reactions. The rates of these various reactions often vary and many of the reactions are endothermic. Because of the endothermic nature of the reforming reactions, typical catalytic reforming processes often include multiple reactors placed in series with intermediate furnaces disposed between each reactor to reheat the effluent between the reactors. Typical catalytic reforming processes can include multiple moving bed reactors and a catalyst regenerator. The catalyst may travel downward through the reactors and may be passed from the last reactor in the series to the regenerator, where the catalyst is regenerated. The regenerated catalyst may then be recycled to the top of the first reactor. However, as the catalyst is passed through the multiple reactors, the amounts of coke deposited on the surfaces of the catalyst may increase. The increasing amounts of coke deposited on the catalyst may decrease the catalytic activity of the catalyst as the catalyst moves progressively through the reforming reactors. As a result, the efficiency of the catalytic reforming process may decrease as the feed stock and effluent pass through the reactors.

SUMMARY

Accordingly, there is an ongoing need for systems and processes for catalytic reforming of hydrocarbon feed stocks to produce various high value chemical products, such as aromatics and high-octane fuels. The systems and processes of the present disclosure may include multiple reforming units in series and a catalyst regenerator. Used catalyst from each reforming unit may be separated from the effluent streams and passed to the catalyst regenerator, where the used catalyst may be regenerated to produce a regenerated catalyst. The regenerated catalyst may be passed to each of the multiple reforming units rather than to only the first reforming unit. Supplying regenerated catalyst to each of the multiple reforming units may maintain the catalytic activity of the catalyst in each reforming unit from the first reforming unit to the last reforming unit. As a result, a higher conversion rate of components that are difficult to reform, such as paraffins, may be achieved. As such, the systems and processes of the present disclosure may produce greater yields of aromatic compounds compared to conventional catalytic reforming systems. Moreover, passing regenerated catalyst to each of the multiple reforming units may increase the heat supplied to each of the multiple reforming units, which may enable at least a portion of the effluents from each of the reforming units to bypass the furnaces and be passed directly to the next reforming unit. As such, the systems and processes of the present disclosure may reduce energy requirements of catalytic reforming systems.

According to one or more embodiments of the present disclosure, a process for catalytic reforming of a hydrocarbon feed stream may include contacting the hydrocarbon feedstock with a first catalyst in a first reforming unit. The contacting may cause reaction of at least a portion of the hydrocarbon feedstock to produce a first reforming effluent and a used first catalyst. The process may further include passing a first portion of the first reforming effluent directly to a second reforming unit. The process may further include contacting the first portion of the first reforming effluent with a second catalyst. The contacting may cause reaction of at least a portion of the first reforming effluent to produce a second reforming effluent and a used second catalyst. The process may further include passing a first portion of the second reforming effluent directly to a third reforming unit. The process may further include contacting the first portion of the second reforming effluent with a third catalyst. The contacting may cause reaction of at least a portion of the second reforming effluent to produce a reformate effluent and a used third catalyst. The process may further include regenerating at least a first portion of the used first catalyst, at least a first portion of the used second catalyst, and at least a first portion of the used third catalyst to produce a regenerated catalyst. The first catalyst, the second catalyst, and the third catalyst each may include the regenerated catalyst.

According to one or more additional embodiments of the present disclosure, a process for catalytic reforming of a hydrocarbon feed stream may include introducing the hydrocarbon feedstock to a first reforming unit operable to contact the hydrocarbon feedstock with a first catalyst. The contact may cause reaction of at least a portion of the hydrocarbon feedstock to produce a first reforming effluent and a used first catalyst. The process may further include passing a first portion of the first reforming effluent directly to a second reforming unit operable to contact the first portion of the first reforming effluent with a second catalyst. The contact may cause reaction of at least a portion of the first reforming effluent to produce a second reforming effluent and a used second catalyst. The process may further include passing a first portion of the second reforming effluent directly to a third reforming unit operable to contact the first portion of the second reforming effluent with a third catalyst. The contact may cause reaction of at least a portion of the second reforming effluent to produce a reformate effluent and a used third catalyst. The process may further include passing at least a portion of the used first catalyst, the used second catalyst, and the used third catalyst to at least one catalyst regenerator operable to regenerate the portions of the used first catalyst, the used second catalyst, and the used third catalyst to produce a regenerated catalyst. The process may further include recycling at least a portion of the regenerated catalyst to one or more of the first reforming unit, the second reforming unit, the third reforming unit, or combinations of these, such that the first catalyst, the second catalyst, and the third catalyst each comprise at least a portion of the regenerated catalyst.

Additional features and advantages of the described embodiments will be set forth in the detailed description that follows, and in part will be readily apparent to those skilled in the art from the description or recognized by practicing the described embodiments, including the detailed description that follows, the claims, as well as the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which.

For the purpose of describing the simplified schematic illustrations and descriptions of FIGS. 1-5, the numerous valves, temperature sensors, electronic controllers and the like that may be employed and well known to those of ordinary skill in the art of certain chemical processing operations are not included. Further, accompanying components that are often included in typical chemical processing operations, such as air supplies, catalyst hoppers, and flue gas handling systems, are not depicted. Accompanying components that are in reformers, such as bleed streams, spent catalyst discharge subsystems, and catalyst replacement sub-systems, are also not shown. It should be understood that these components are within the spirit and scope of the present embodiments disclosed. However, operational components, such as those described in the present disclosure, may be added to the embodiments described in this disclosure.

It should further be noted that arrows in the drawings refer to process streams. However, the arrows may equivalently refer to transfer lines that may serve to transfer process streams between two or more system components. Additionally, arrows that connect to system components define inlets or outlets in each given system component. The arrow direction corresponds generally with the major direction of movement of the materials of the stream contained within the physical transfer line signified by the arrow. Furthermore, arrows that do not connect two or more system components signify a product stream that exits the depicted system or a system inlet stream that enters the depicted system. Product streams may be further processed in accompanying chemical processing systems or may be commercialized as end products. System inlet streams may be streams transferred from accompanying chemical processing systems or may be non-processed feedstock streams. Some arrows may represent recycle streams, which are effluent streams of system components that are recycled back into the system. However, it should be understood that any represented recycle stream, in some embodiments, may be replaced by a system inlet stream of the same material, and that a portion of a recycle stream may exit the system as a system product.

Additionally, arrows in the drawings may schematically depict process steps of transporting a stream from one system component to another system component. For example, an arrow from one system component pointing to another system component may represent "passing" a system component effluent to another system component, which may include the contents of a process stream "exiting" or being "removed" from one system component and "introducing" the contents of that product stream to another system component.

It should be understood that two or more process streams are "mixed" or "combined" when two or more lines intersect in the schematic flow diagrams of FIGS. 1-5. Mixing or combining may also include mixing by directly introducing both streams into a like reactor, separation device, or other system component. For example, it should be understood that when two streams are depicted as being combined directly prior to entering a separation unit or reactor, that in some embodiments the streams could equivalently be introduced into the separation unit or reactor and be mixed in the reactor.

Reference will now be made in greater detail to various embodiments, some embodiments of which are illustrated in the accompanying drawings.

DETAILED DESCRIPTION

Embodiments of the present disclosure are directed to systems and processes for catalytic reforming of a hydrocarbon feed stream that include passing regenerated catalyst to each reactor of the catalytic reforming system. For example, a process for catalytic reforming of a hydrocarbon feedstock may include contacting the hydrocarbon feedstock with a first catalyst in a first reforming unit. The contacting may cause reaction of at least a portion of the hydrocarbon feedstock to produce a first reforming effluent and a used first catalyst. The method may further include passing a first portion of the first reforming effluent directly to a second reforming unit and contacting the first reforming effluent with a second catalyst. The contacting may cause reaction of at least a portion of the first reforming effluent to produce a second reforming effluent and a used second catalyst. The method may also include passing a first portion of the second reforming effluent directly to a third reforming unit and contacting the second reforming effluent with a third catalyst. The contacting may cause reaction of at least a portion of the second reforming effluent to produce a reformate effluent and a used third catalyst. Additionally, the method may include regenerating at least a first portion of the used first catalyst, at least a first portion of the used second catalyst, and at least a first portion of the used third catalyst to produce regenerated catalyst. The first catalyst, the second catalyst, and the third catalyst may each include regenerated catalyst. The supply of regenerated catalyst to each reforming unit may result in a higher conversion rate of components and, as such, produce greater yields of aromatic compounds compared to conventional catalytic reforming systems. Moreover, the supply of regenerated catalyst to each reforming unit may increase the heat supplied to each of the multiple reforming units, which may enable at least a portion of the effluents from each reforming unit to bypass the furnaces and reduce energy requirements of the catalytic reforming system.

It should be understood that streams may be named for the components of the stream, and the component for which the stream is named may be the major component of the stream (such as comprising from 50 weight percent (wt. %), from 70 wt. %, from 90 wt. %, from 95 wt. %, from 99 wt. %, from 99.5 wt. %, or even from 99.9 wt. % of the contents of the stream to 100 wt. % of the contents of the stream). It should also be understood that components of a stream are disclosed as passing from one system component to another when a stream comprising that component is disclosed as passing from that system component to another. For example, a disclosed "naphtha stream" passing to a first system component or from a first system component to a second system component should be understood to equivalently disclose "naphtha" passing to the first system component or passing from a first system component to a second system component.

As used throughout the present disclosure, the term "inlet temperature" may refer to the average temperature of a stream, such as a feedstock or an effluent, as it is introduced into a system component, such as a reforming unit, a reactor, or reaction zone, through one or more inlets of the reforming unit, reactor, or reaction zone.

As used throughout the present disclosure, the term "reform" may refer to one or more catalytic reactions that the hydrocarbons present in a reforming unit may undergo. For example, the one or more catalytic reactions may include dehydrogenation of naphthenes to aromatics, dehydrocyclization of paraffins, isomerization of paraffins and naphthenes, other catalytic reactions, or combinations of these.

As used throughout the present disclosure, the term "catalyst" may refer to any substance that increases the rate of a particular chemical reaction. Catalysts described in the present disclosure may be utilized to promote various reactions, such as dehydrogenation, dehydrocyclization, isomerization, other catalytic reactions, or combinations of these. The term "used catalyst" may refer to catalyst that has been introduced to and passed through a reforming unit and caused a reaction of at least a portion of a hydrocarbon material but has not been regenerated in a catalyst regenerator. Used catalyst may have coke deposited on at least a portion of the catalyst and may include partially coked catalyst as well as fully coked catalyst. The amount of coke deposited on the used catalyst may be greater than the amount of coke remaining on the regenerated catalyst following regeneration. The term "regenerated catalyst" may refer to catalyst that has been introduced to a reforming unit and then regenerated in a catalyst regenerator.

As used throughout the present disclosure, the term "catalytic activity" may refer to the degree to which a catalyst increases the rate of the cracking reactions relative to the rate of cracking reactions without the regenerated catalyst and may be related to a number of catalytically active sites available on the catalyst. For example, coke deposits on the catalyst may cover up or block catalytically active sites on the used catalyst, thus, reducing the number of catalytically active sites available, which may reduce the catalytic activity of the catalyst. Conversely, regenerating a used catalyst may remove a portion of coke deposits from the catalyst to un-block catalytically active sites on regenerated catalyst, thus, increasing the number of catalytically active sites available and increasing the catalytic activity of the regenerated catalyst relative to the used catalyst.

As used throughout the present disclosure, the term "effluent" may refer to a process stream that exits a system component, such as a reforming unit, a reactor, or reaction zone, following a particular reaction and generally has a different composition (at least proportionally) than the stream that entered the reforming unit, reactor, or reaction zone.

Figure 1:
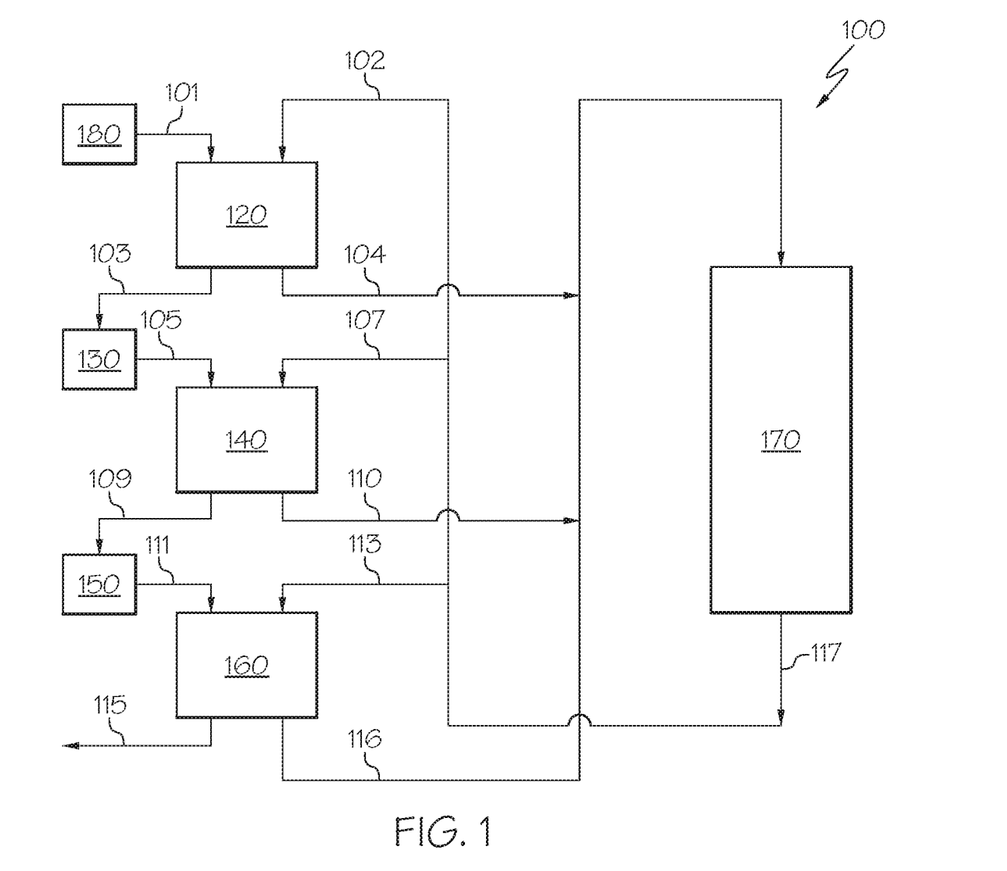
FIG. 1 depicts a generalized schematic diagram of an embodiment of a catalytic reforming system, according to one or more embodiments described in this disclosure.

Referring now to FIG. 1, a catalytic reforming system 100 is schematically depicted. The catalytic reforming system 100 may be operable to receive a hydrocarbon feedstock 101 and directly processes the hydrocarbon feedstock 101 to produce one or more reformate effluents 115. The catalytic reforming system 100 may include a plurality of reforming units in series, such as two reforming units, three reforming units, four reforming units, five reforming units, or more than five reforming units. For example, the catalytic reforming system 100 may include at least a first reforming unit 120, a second reforming unit 140, and a third reforming unit 160. The catalytic reforming system 100 may additionally include a first heating unit 180 disposed upstream of the first reforming unit 120, a second heating unit 130 disposed between the first reforming unit 120 and the second reforming unit 140, and a third heating unit 150 disposed between the second reforming unit 140 and the third reforming unit 160. The catalytic reforming system 100 may additionally include a catalyst regenerator 170 disposed downstream of the plurality of reforming units. For convenience, the catalytic reforming system 100 is depicted in the drawings and described in the present disclosure as having three reforming units. However, it is understood that the catalytic reforming system 100 may also have more than three reforming units, such as four reforming units, five reforming units, or more than five reforming units.

The hydrocarbon feedstock 101 may generally comprise one or more hydrocarbons. The one or more hydrocarbons of the hydrocarbon feedstock 101 may comprise paraffins, naphthenes, aromatics, olefins, other hydrocarbons, or combinations of these. For example, the one or more hydrocarbons of the hydrocarbon feedstock 101 may comprise a heavy naphtha stream boiling in a range of from 50 degrees Celsius (° C.) to 250° C., such as from 80° C. to 180° C. As used in the present disclosure, the term "heavy naphtha stream" may refer to a naphtha stream that contains straight-run naphtha, such as the overhead liquid distillate collected from a crude oil distillation unit, cracked naphtha, such as the effluent collected from various cracking processes, or mixed naphtha, which includes a mixture of both straight-run and cracked naphtha. The heavy naphtha stream may be hydrotreated such that the sulfur content, the nitrogen content, or both are reduced to, for example, less than 1 parts per million (ppm).

The one or more hydrocarbons of the hydrocarbon feedstock 101 may comprise from 60 wt. % to 70 wt. % paraffins based on the total mass flow rate of the hydrocarbon feedstock 101. For example, the one or more hydrocarbons of the hydrocarbon feedstock 101 may comprise from 60 wt. % to 68 wt. %, from 60 wt. % to 66 wt. %, from 60 wt. % to 64 wt. %, from 60 wt. % to 62 wt. %, from 62 wt. % to 70 wt. %, from 62 wt. % to 68 wt. %, from 62 wt. % to 66 wt. %, from 62 wt. % to 64 wt. %, from 64 wt. % to 70 wt. %, from 64 wt. % to 68 wt. %, from 64 wt. % to 66 wt. %, from 66 wt. % to 70 wt. %, from 66 wt. % to 68 wt. %, or from 68 wt. % to 70 wt. % paraffins based on the total mass flow rate of the hydrocarbon feedstock 101.

The one or more hydrocarbons of the hydrocarbon feedstock 101 may comprise from 10 wt. % to 20 wt. % naphthenes based on the total mass flow rate of the hydrocarbon feedstock 101. For example, the one or more hydrocarbons of the hydrocarbon feedstock 101 may comprise from 10 wt. % to 18 wt. %, from 10 wt. % to 16 wt. %, from 10 wt. % to 14 wt. %, from 10 wt. % to 12 wt. %, from 12 wt. % to 20 wt. %, from 12 wt. % to 18 wt. %, from 12 wt. % to 16 wt. %, from 12 wt. % to 14 wt. %, from 14 wt. % to 20 wt. %, from 14 wt. % to 18 wt. %, from 14 wt. % to 16 wt. %, from 16 wt. % to 20 wt. %, from 16 wt. % to 18 wt. %, or from 18 wt. % to 20 wt. % naphthenes based on the total mass flow rate of the hydrocarbon feedstock 101.

The one or more hydrocarbons of the hydrocarbon feedstock 101 may comprise from 10 wt. % to 20 wt. % aromatics based on the total mass flow rate of the hydrocarbon feedstock 101. For example, the one or more hydrocarbons of the hydrocarbon feedstock 101 may comprise from 10 wt. % to 18 wt. %, from 10 wt. % to 16 wt. %, from 10 wt. % to 14 wt. %, from 10 wt. % to 12 wt. %, from 12 wt. % to 20 wt. %, from 12 wt. % to 18 wt. %, from 12 wt. % to 16 wt. %, from 12 wt. % to 14 wt. %, from 14 wt. % to 20 wt. %, from 14 wt. % to 18 wt. %, from 14 wt. % to 16 wt. %, from 16 wt. % to 20 wt. %, from 16 wt. % to 18 wt. %, or from 18 wt. % to 20 wt. % aromatics based on the total mass flow rate of the hydrocarbon feedstock 101.

The one or more hydrocarbons of the hydrocarbon feedstock 101 may comprise from 0 wt. % to 3 wt. % olefins based on the total mass flow rate of the hydrocarbon feedstock 101. For example, the one or more hydrocarbons of the hydrocarbon feedstock 101 may comprise from 0 wt. % to 2 wt. %, from 0 wt. % to 1 wt. %, from 1 wt. % to 3 wt. %, from 1 wt. % to 2 wt. %, or from 2 wt. % to 3 wt. % olefins based on the total mass flow rate of the hydrocarbon feedstock 101.

The hydrocarbon feedstock 101 may further comprise hydrogen gas. The hydrogen gas may be supplied from a hydrogen source outside of the system, such as a feed hydrogen stream, or may be supplied from a system recycle stream, such as hydrogen gas separated from the reformate effluent 115 described subsequently in the present disclosure. The hydrogen gas may include hydrogen from a combination of sources, such as partially being supplied from a feed hydrogen stream and partially being supplied from a system recycle stream. Hydrogen gas recycled from the reformate effluent 115 may include hydrocarbons, such as light paraffins and olefins. The volumetric ratio of the hydrogen gas to the one or more hydrocarbons in the hydrocarbon feedstock 101 may be from 500:1 to 1500:1, from 500:1 to 1300:1, from 500:1 to 1100:1, from 500:1 to 900:1, from 500:1 to 700:1, from 700:1 to 1500:1, from 700:1 to 1300:1, from 700:1 to 1100:1, from 700:1 to 900:1, from 900:1 to 1500:1, from 900:1 to 1300:1, from 900:1 to 1100:1, from 1100:1 to 1500:1, from 1100:1 to 1300:1, or from 1300:1 to 1500:1. The hydrogen gas may be mixed directly with the one or more hydrocarbons of the hydrocarbon feedstock 101 or introduced directly to the reforming unit 120. Hydrogen may also be introduced separately to each of the second reforming unit 140, the third reforming unit 160, or both. For example, hydrogen gas may be passed to each of the reforming units 120, 140, 160, such as passing hydrogen directly and independently to each of the first reforming unit 120, the second reforming unit 140, the third reforming unit 160, or combinations of these, or by combining the hydrogen with at least one stream passed to one or more of the first reforming unit 120, the second reforming unit 140, the third reforming unit 160, or combinations of these.

The reforming units 120, 140, 160 may be operable to contact a hydrocarbon feedstock or effluent from another reforming unit with a catalyst. The reforming units 120, 140, 160 may be moving bed reactors, such as fluidized bed reactors. The reforming units 120, 140, 160 may be down flow reactors arranged in series such that a hydrocarbon feedstock and any resulting effluent passes vertically downward through each reforming unit before being passed to the next. For example, a hydrocarbon feedstock may be introduced to the top of the first reforming unit 120 and may exit the bottom before being passed to the second reforming unit 140.

As described in the present disclosure, the catalyst reforming system 100 may be operable to contact a hydrocarbon feedstock or effluent with a catalyst. The catalyst may be operable to promote dehydrogenation, dehydrocyclization, isomerization, cracking, other catalytic reactions, or combinations of these, of the one or more hydrocarbons of a hydrocarbon feedstock or an effluent. The catalyst may include one or more metals, metal oxides, organometalics, other catalytic systems, or combinations of these. For example, the catalyst may include a metal, such as platinum, palladium, gold, other noble metals, or combinations of these. The metal of the catalyst may be supported on a support material. The catalyst may include the metal deposited on surfaces of the metal oxide support material. Metal oxide support materials may include, but are not limited to, aluminum oxide, zirconium oxide, titanium oxide, other metal oxides, or combinations of these. The catalyst may include the metal deposited on a zeolite support material. For example, the catalyst may include the metal deposited on an MFI framework zeolite, an FAU framework zeolite, a *BEA framework zeolite, other zeolites, or combinations of these.

The heating units 130, 150, 180 may be operable to heat a hydrocarbon feedstock or effluent from a reforming unit to a temperature sufficient to promote one or more reforming reactions. That is, heating units 130, 150, 180 may be operable to transfer heat from one or more heat sources to a hydrocarbon feedstock or effluent from a reforming unit such that the temperature of the hydrocarbon feedstock or effluent can be increased to a specified temperature. The heating units 130, 150, 180 may be heat exchangers, such as a shell and tube heat exchanger; furnaces, such as an electric furnace or a gas-fired furnace; or some combination of these.

The catalyst regenerator 170 may be operable to regenerate a catalyst, such as by heating the catalyst to a greater temperature, oxidizing and removing at least a portion of the coke from the catalyst to restore at least a portion of the catalytic activity of the catalyst, or both. The catalytic activity of regenerated catalyst may be restored such that regenerated catalyst is catalytically effective. The term "catalytically effective" may refer to the ability of regenerated catalyst to increase the rate of certain catalytic reactions, such as those described in the present disclosure. The catalyst regenerator 170 may utilize the combustion of fuels, such as a hydrocarbon gas, to generate the heat necessary to regenerate the catalyst.

In operation, the hydrocarbon feedstock 101 may be heated, for example, by the first heating unit 180, prior to being introduced to the first reforming unit 120. The hydrocarbon feedstock 101 may be heated to a temperature sufficient to promote the reforming of the hydrocarbon feedstock 101. The temperature of the hydrocarbon feedstock 101 may be determined by the inlet temperature of the first reforming unit 120. The inlet temperature of the first reforming unit 120 may be from 480 degrees Celsius (° C.) to 550° C. For example, the inlet temperature of the first reforming unit 120 may be from 480° C. to 540° C., from 480° C. to 530° C., from 480° C. to 520° C., from 480° C. to 510° C., from 480° C. to 500° C., from 480° C. to 490° C., from 490° C. to 550° C., from 490° C. to 540° C., from 490° C. to 530° C., from 490° C. to 520° C., from 490° C. to 510° C., from 490° C. to 500° C., from 500° C. to 550° C., from 500° C. to 540° C., from 500° C. to 530° C., from 500° C. to 520° C., from 500° C. to 510° C., from 510° C. to 550° C., from 510° C. to 540° C., from 510° C. to 530° C., from 510° C. to 520° C., from 520° C. to 550° C., from 520° C. to 540° C., from 520° C. to 530° C., from 530° C. to 550° C., from 530° C. to 540° C., or from 540° C. to 550° C. When the inlet temperature of the first reforming unit 120 is less than 480° C., the temperature of the hydrocarbon feedstock 101 may not be sufficient to promote the desired catalytic reactions of reforming. Conversely, when the inlet temperature of the first reforming unit 120 is greater than 550° C., the rate of side reactions that reduce the yield of aromatics, such as hydrocracking and dealkylation, in the first reforming unit 120 may increase. Without being bound by any particular theory, it is believed that this increase in reaction rate of side reactions may cause a substantial decrease in the yield of aromatic compounds or other valuable organic products.

After introduction of the hydrocarbon feed stock 101 to the first reforming unit 120, the first reforming unit 120 may be operable to contact the hydrocarbon feedstock 101 with a first catalyst 102. During steady state operation of the catalytic reforming system 100, the first catalyst 102 may include at least a portion of a regenerated catalyst 117 that may be passed to the first reforming unit 120 from the catalyst regenerator 170. During an initial start-up of the catalytic reforming system 100, the first catalyst 102 may include fresh catalyst (not shown), which is catalyst that has not been circulated through the reforming units 120, 140, 160 and the catalyst regenerator 170. Alternatively, the first catalyst 102 may be a mixture of regenerated catalyst 117 and fresh catalyst. Fresh catalyst may also be introduced into the first reforming unit 120 during operation of the catalytic reforming system 100 so that a portion of the first catalyst 102 introduced into the first reforming unit 120 includes the fresh catalyst. Fresh catalyst may also be introduced into the first reforming unit 120 periodically during operation to replenish lost catalyst or compensate for spent catalyst that becomes deactivated, such as through heavy metal accumulation in the catalyst.

The contacting of the hydrocarbon feed stock 101 with the first catalyst 102 may cause reaction of at least a portion of the hydrocarbon feedstock 101 to produce a first effluent 103 and a used first catalyst 104. That is, the contacting of the hydrocarbon feed stock 101 with the first catalyst 102 may at least partially reduce the content of paraffins and naphthenes in the hydrocarbon feedstock 101. For example, the first effluent 103 may have a content of one or more of paraffins and naphthenes that is less than a content of the one or more paraffins and naphthenes of the hydrocarbon feed tock 101 by at least 5 percent (%), at least 10%, at least 20%, at least 30%, at least 40%, or at least 50%. Additionally, the contacting of the hydrocarbon feed stock 101 with the first catalyst 102 may at least partially increase the content of aromatics in the hydrocarbon feedstock 101. For example, the first effluent 103 may have an aromatic content that is greater than an aromatic content of the hydrocarbon feedstock 101 by at least 5%, at least 10%, at least 25%, at least 50%, at least 75%, at least 100%, at least 200%, at least 300%, or at least 400%.

The reaction of at least a portion of the hydrocarbon feedstock 101 may at least partially reduce the temperature of the hydrocarbon feedstock 101. Without being bound by any particular theory, it is believed that the temperature decrease may be due to the endothermic nature of the one or more catalytic reactions that may occur during reforming. In this regard, the first effluent 103 may have a temperature less than the inlet temperature of the first reforming unit 120. The first effluent 103 may have a temperature of from 400° C. to 450° C. For example, the first effluent 103 may have a temperature of from 400° C. to 440° C., from 400° C. to 430° C., from 400° C. to 420° C., from 400° C. to 410° C., from 410° C. to 450° C., from 410° C. to 440° C., from 410° C. to 430° C., from 410° C. to 420° C., from 420° C. to 450° C., from 420° C. to 440° C., from 420° C. to 430° C., from 430° C. to 450° C., from 430° C. to 440° C., or from 440° C. to 450° C.

The reaction of at least a portion of the hydrocarbon feedstock 101 may cause carbonaceous deposits, commonly referred to as coke, to form on portions of the catalyst. The coke deposits formed on the catalyst may reduce the catalytic activity of the catalyst. At least a portion of the used first catalyst 104 having coke deposits may be separated from the first effluent 103, stripped of removable hydrocarbons, and passed to the catalyst regenerator 170. The catalyst regenerator 170 may be operable to regenerate at least a portion of the used first catalyst 104 to produce regenerated catalyst 117. The catalyst regenerator 170 may be operable to heat the regenerated catalyst to a temperature sufficient to promote one or more catalytic reactions of hydrocarbons. The catalyst regenerator 170 may be operable to heat regenerated catalyst 117 to an average temperature of from 450° C. to 475° C. For example, the catalyst regenerator 170 may be operable to heat regenerated catalyst 117 to an average temperature of from 450° C. to 470° C., from 450° C. to 465° C., from 450° C. to 460° C., from 450° C. to 455° C., from 455° C. to 475° C., from 455° C. to 470° C., from 455° C. to 465° C., from 455° C. to 460° C., from 460° C. to 475° C., from 460° C. to 470° C., from 460° C. to 465° C., from 465° C. to 475° C., from 465° C. to 470° C., or from 470° C. to 475° C. When regenerated catalyst 117 is heated to a temperature that is greater than 475° C., the temperature may cause a degradation in the quality of or attrition of regenerated catalyst 117.

The first effluent 103 may be passed from the first reforming unit 120 to the second heating unit 130. The second heating unit 130 may be operable to heat the first effluent 103 to a temperature sufficient to promote the reform of hydrocarbons and form a heated first effluent 105. The temperature of the first heated effluent 105 may depend on the inlet temperature of the second reforming unit 140. The inlet temperature of the second reforming unit 140 may be from 480° C. to 520° C. For example, the inlet temperature of the second reforming unit 140 may be from 482° C. to 518° C., from 484° C. to 516° C., from 486° C. to 514° C., from 488° C. to 512° C., from 490° C. to 510° C., from 492° C. to 508° C., from 494° C. to 506° C., from 496° C. to 504° C., or from 498° C. to 502° C. When the inlet temperature of the second reforming unit 140 is less than 480° C., the temperature of the first heated effluent 105 may not be sufficient to promote the desired catalytic reactions of reforming. Conversely, when the inlet temperature of the second reforming unit 140 is greater than 520° C., the rate of side reactions that may reduce the yield of aromatics, such as hydrocracking and dealkylation, in the second reforming unit 140 may increase.

After passing of the heated first effluent 105 to the second reforming unit 140, the second reforming unit 140 may be operable to contact the heated first effluent 105 with a second catalyst 107. The second catalyst 107 may include at least a portion of a regenerated catalyst 117 passed to the second reforming unit 140 from the catalyst regenerator 170. Without being bound by any particular theory, it is believed that the inclusion of regenerated catalyst 117 in the second catalyst 107 may allow for a decreased inlet temperature of the second reforming unit 140. As described in the present disclosure, the regenerated catalyst 117 may have increased catalytic activity when compared to a used catalyst. This increased activity may enable the hydrocarbons to be reformed in the second reforming unit 140 at a lesser temperature compared to the temperature of the second reforming unit 140 when used catalyst is passed from the first reforming unit 120 to the second reforming unit 140. This may allow the temperatures of the process streams, such as the temperature of first heated effluent 105, to be reduced compared to the temperatures of the process streams required when used catalyst is passed between the reforming units. The decreased temperatures of the process streams and reforming units may also reduce the rate of side reactions, as noted previously, and, as such, increase the yield of aromatics. Moreover, the decreased temperatures of the reforming units and the reforming unit effluents may reduce the energy requirement to heat the reforming unit effluents.

The contacting of the heated first effluent 105 with the second catalyst 107 may cause reaction of at least a portion of the heated first effluent 105 to produce a second effluent 109 and a used second catalyst 110. That is, the contacting of the heated first effluent 105 with the second catalyst 107 may at least partially reduce the content of paraffins and naphthenes in the heated first effluent 105. For example, the second effluent 109 may have a content of one or more of paraffins and naphthenes that is less than a content of the one or more paraffins and naphthenes of the heated first effluent 105 by at least 5 percent (%), at least 10%, at least 20%, at least 30%, at least 40%, or at least 50%. Additionally, the contacting of the heated first effluent 105 with the second catalyst 107 may at least partially increase the content of aromatics in the heated first effluent 105. For example, the second effluent 109 may have an aromatic content that is greater than an aromatic content of the heated first effluent 105 by at least 5%, at least 10%, at least 15%, at least 25%, or at least 50%.

The reaction of at least a portion of the heated first effluent 105 may at least partially reduce the temperature of the heated first effluent 105. In this regard, the second effluent 109 may have a temperature less than the inlet temperature of the second reforming unit 140. The second effluent 109 may have a temperature of from 425° C. to 475° C. For example, the second effluent 109 may have a temperature of from 425° C. to 465° C., from 425° C. to 455° C., from 425° C. to 445° C., from 425° C. to 435° C., from 435° C. to 475° C., from 435° C. to 465° C., from 435° C. to 455° C., from 435° C. to 445° C., from 445° C. to 475° C., from 445° C. to 465° C., from 445° C. to 455° C., from 455° C. to 475° C., from 455° C. to 465° C., or from 465° C. to 475° C. Without being bound by any particular theory, it is believed that the temperature of the second effluent 109 may be greater than the temperature of the first effluent 103 due to the greater number and type of catalytic reactions and, as such, endothermic reactions, that occur within the first reforming unit 120 when compared to the second reforming unit 140.

The reaction of at least a portion of the heated first effluent 105 in the presence of the second catalyst 107 may cause carbonaceous deposits, commonly referred to as coke, to form on portions of the catalyst. At least a portion of the used second catalyst 110 having coke deposits may be separated from the second effluent 109, stripped of removable hydrocarbons, and passed to the catalyst regenerator 170. The catalyst regenerator 170 may be operable to regenerate at least a portion of the used second catalyst 110 to produce regenerated catalyst 117.

The second effluent 109 may be passed from the second reforming unit 140 to the third heating unit 150. The third heating unit 150 may be operable to heat the second effluent 109 to a temperature sufficient to promote the reform of hydrocarbons and form a heated second effluent 111. The temperature of the second heated effluent 111 may depend on the inlet temperature of the third reforming unit 160. The inlet temperature of the third reforming unit 160 may be from 480° C. to 520° C. For example, the inlet temperature of the third reforming unit 160 may be from 482° C. to 518° C., from 484° C. to 516° C., from 486° C. to 514° C., from 488° C. to 512° C., from 490° C. to 510° C., from 492° C. to 508° C., from 494° C. to 506° C., from 496° C. to 504° C., or from 498° C. to 502° C. When the inlet temperature of the third reforming unit 160 is less than 480° C., the temperature of the second heated effluent 111 may not be sufficient to promote the desired catalytic reactions of reforming. Conversely, when the inlet temperature of the third reforming unit 160 is greater than 520° C., the rate of side reactions that may reduce the yield of aromatics, such as hydrocracking and dealkylation, occurring within the third reforming unit 160 may increase.

After passing of the heated second effluent 111 to the third reforming unit 160, the third reforming unit 160 may be operable to contact the heated second effluent 111 with a third catalyst 113. The third catalyst 113 may include at least a portion of a regenerated catalyst 117 that may be passed to the third reforming unit 160 from the catalyst regenerator 170. Without being bound by any particular theory, it is believed that the inclusion of regenerated catalyst 117 in the third catalyst 113 may allow for a decreased inlet temperature of the third reforming unit 160. As described in the present disclosure, the regenerated catalyst 117 may have increased catalytic activity when compared to a used catalyst. This increased activity may allow for decreased effluent temperatures, such as the temperature of second heated effluent 111, required to sufficiently promote the reform of hydrocarbons in the third reforming unit 160. The decreased temperatures may also reduce the rate of side reactions, as noted previously, and, as such, increase the yield of aromatics. Moreover, the decreased temperatures may reduce the energy requirement to heat the reforming unit effluents.

The contacting of the heated second effluent 111 with the third catalyst 113 may cause reaction of at least a portion of the heated second effluent 111 to produce a reformate effluent 115 and a used third catalyst 116. That is, the contacting of the heated second effluent 111 with the third catalyst 113 may at least partially reduce the content of paraffins and naphthenes in the heated second effluent 111. For example, the reformate effluent 115 may have a content of one or more of paraffins and naphthenes that is less than a content of the one or more paraffins and naphthenes of the heated second effluent 111 by at least 5%, at least 10%, at least 20%, at least 30%, at least 40%, or at least 50%. Additionally, the contacting of the heated second effluent 111 with the third catalyst 113 may at least partially increase the content of aromatics in the heated second effluent 111. For example, the reformate effluent 115 may have an aromatic content that is greater than an aromatic content of the heated second effluent 111 by at least 5%, at least 10%, at least 15%, at least 25%, or at least 50%.

The reaction of at least a portion of the heated second effluent 111 in the presence of the third catalyst 113 may cause carbonaceous deposits, commonly referred to as coke, to form on portions of the catalyst. At least a portion of the used third catalyst 116 having coke deposits may be separated from the reformate effluent 115, stripped of removable hydrocarbons, and passed to the catalyst regenerator 170. The catalyst regenerator 170 may be operable to regenerate at least a portion of the used third catalyst 116 to produce regenerated catalyst 117.

Figure 2:
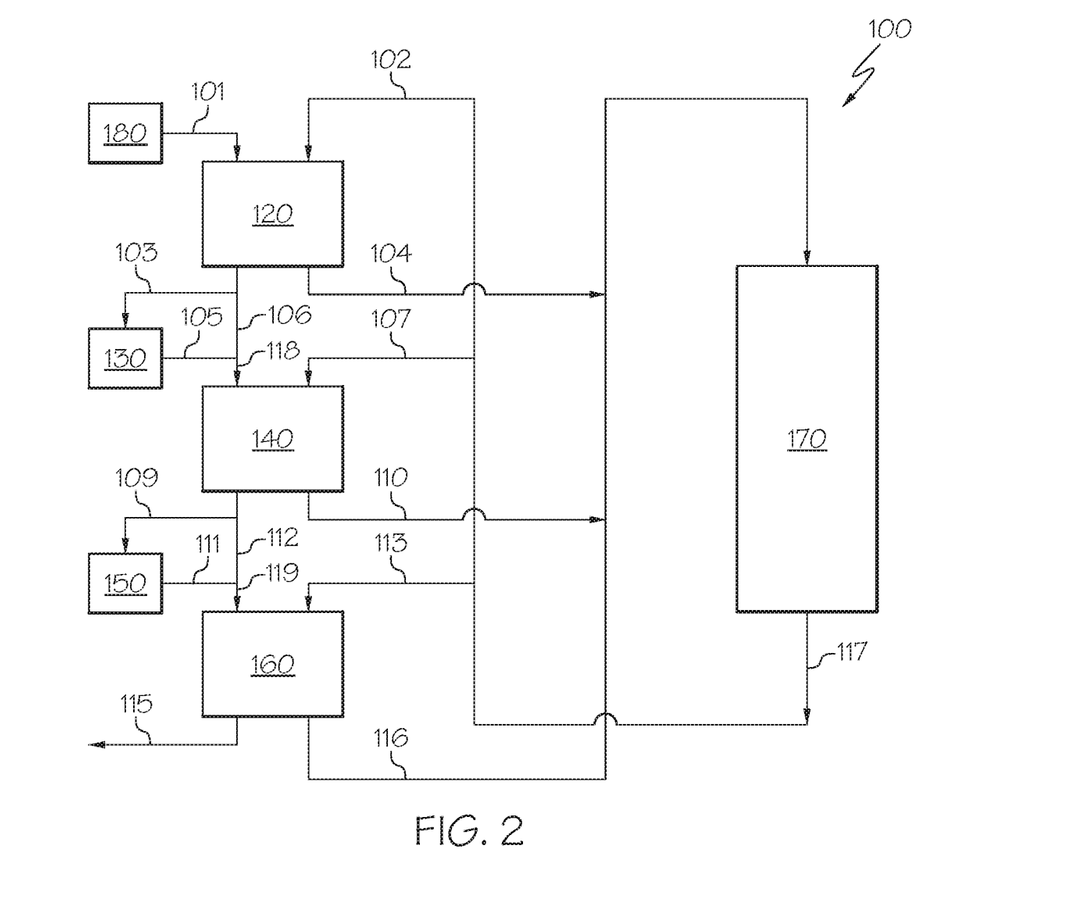
FIG. 2 depicts a generalized schematic diagram of another embodiment of a catalytic reforming system, according to one or more embodiments described in this disclosure.

Referring now to FIG. 2, the catalytic conversion system 100 is depicted in which at least a portion of the produced effluents, such as those produced in the first reforming unit 120 and the second reforming unit 140, may bypass the heating units. In the catalytic reforming system 100 depicted in FIG. 2, after contacting the hydrocarbon feedstock 101 with the first catalyst 102, as described previously with respect to the catalytic reforming system 100 depicted in FIG. 1, a first portion of the resulting effluent, first bypass effluent 106, may be passed directly to the second reforming unit 140. Additionally, a second portion of the resulting effluent, effluent 103, may be passed to the first heating unit 130 and heated, as described previously with respect to the catalytic reforming system 100 depicted in FIG. 1, to form a heated first effluent 105. The heated first effluent 105 and the first bypass effluent 106 may be combined to form a first combined effluent 118, which may then be passed to the second reforming unit 140. In some embodiments, the heated first effluent 105 and the first bypass effluent 106 may be independently passed to the second reforming unit 140. A ratio of first bypass effluent 106 to heated first effluent 105 passed to the second reforming unit 140 may be adjusted based on one or more various factors, such as, but not limited to, the desired inlet temperature of the second reforming unit 140, the temperature of the second catalyst 107, other parameters, or combinations of these.

The heated first effluent 105, the first bypass effluent 106, or both, may be contacted with the second catalyst 107 in the second reforming unit 140. After contacting the heated first effluent 105, the first bypass effluent 106, or both, with the second catalyst 107, as described previously with respect to the catalytic reforming system 100 depicted in FIG. 1, a first portion of the resulting effluent, second bypass effluent 112, may be passed directly to the third reforming unit 160. Additionally, a second portion of the resulting effluent, effluent 109, may be passed to the second heating unit 150 and heated, as described previously with respect to the catalytic reforming system 100 depicted in FIG. 1, to form a heated second effluent 111. The heated second effluent 111 and the second bypass effluent 112 may be combined to form a second combined effluent 119, which may then be passed to the third reforming unit 160. In some embodiments, the heated second effluent 111 and the second bypass effluent 112 may be independently passed to the third reforming unit 160. A ratio of second bypass effluent 112 to heated second effluent 111 passed to the third reforming unit 160 may be determined by various factors, such as, but not limited to, the desired inlet temperature of the third reforming unit 160, the temperature of the third catalyst 113, other parameters, or combinations of these. As described in the present disclosure, the supply of regenerated catalyst 117 to each of the reforming units 120, 140, 106 may increase the heat supplied to each of the reforming units and the activity of the catalyst when compared to reforming systems that pass used catalyst, such as used first catalyst 104, directly from one reforming unit to the next. As a result, at least a portion of the effluents may be passed directly to the next reforming unit instead of being passed through the heating units 130, 150. This may reduce energy requirements of the catalytic reforming system 100.

Figure 3:
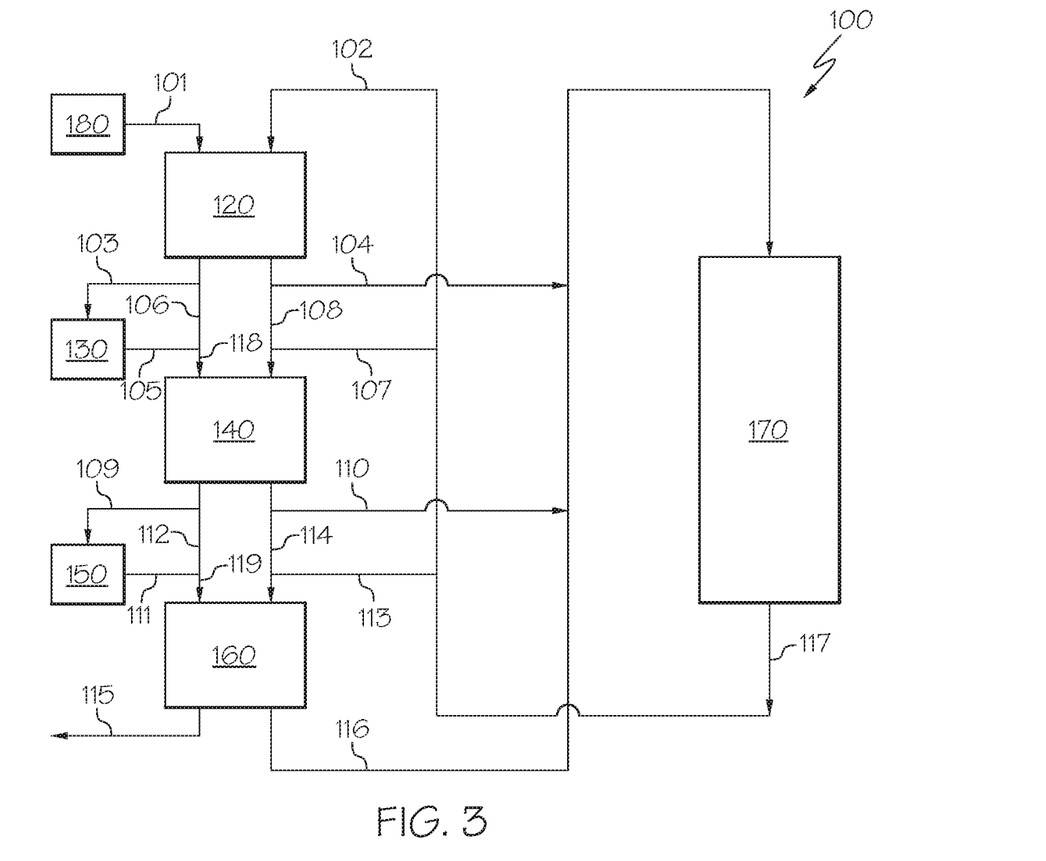
FIG. 3 depicts a generalized schematic diagram of another embodiment of a catalytic reforming system, according to one or more embodiments described in this disclosure.

Referring now to FIG. 3, the catalytic conversion system 100 is depicted in which at least a portion of the used catalyst, such as those produced in the first reforming unit 120 and the second reforming unit 140, may be passed directly to the next reforming unit in series without regeneration. In the catalytic reforming system 100 depicted in FIG. 3, after contacting the hydrocarbon feedstock 101 with the first catalyst 102, as described previously with respect to the catalytic reforming system 100 depicted in FIGS. 1 and 2, a first portion of the resulting used catalyst, used first catalyst 104, may be passed to the catalyst regenerator 170 to be regenerated, as described previously. Additionally, a second portion of the resulting used catalyst, first bypass catalyst 108, may be passed directly to the second reforming unit 140. That is, the second catalyst 107 passed to the second reforming unit 140 may include regenerated catalyst 117, as described previously with respect to the catalytic reforming system 100 as depicted in FIG. 1, and first bypass catalyst 108. Similarly, after contacting effluent with the second catalyst 107, as described previously with respect to the catalytic reforming system 100 depicted in FIGS. 1 and 2, a first portion of the resulting used catalyst, used second catalyst 110, may be passed to the catalyst regenerator 170 to be regenerated, as described previously. Additionally, a second portion of the resulting used catalyst, second bypass catalyst 114, may be passed directly to the third reforming unit 160. That is, the third catalyst 113 passed to the third reforming unit 160 may include regenerated catalyst 117, as described previously with respect to the catalytic reforming system 100 as depicted in FIG. 1, and second bypass catalyst 114. Without being bound by any particular theory, it is believed that passing a portion of the used catalyst directly to the next reforming unit with a portion of the regenerated catalyst may allow control over the desired catalyst activity in the reforming unit. This control of catalyst activity may allow a particular product quality, as determined by the composition of the effluent, to be produced.

Figure 4:
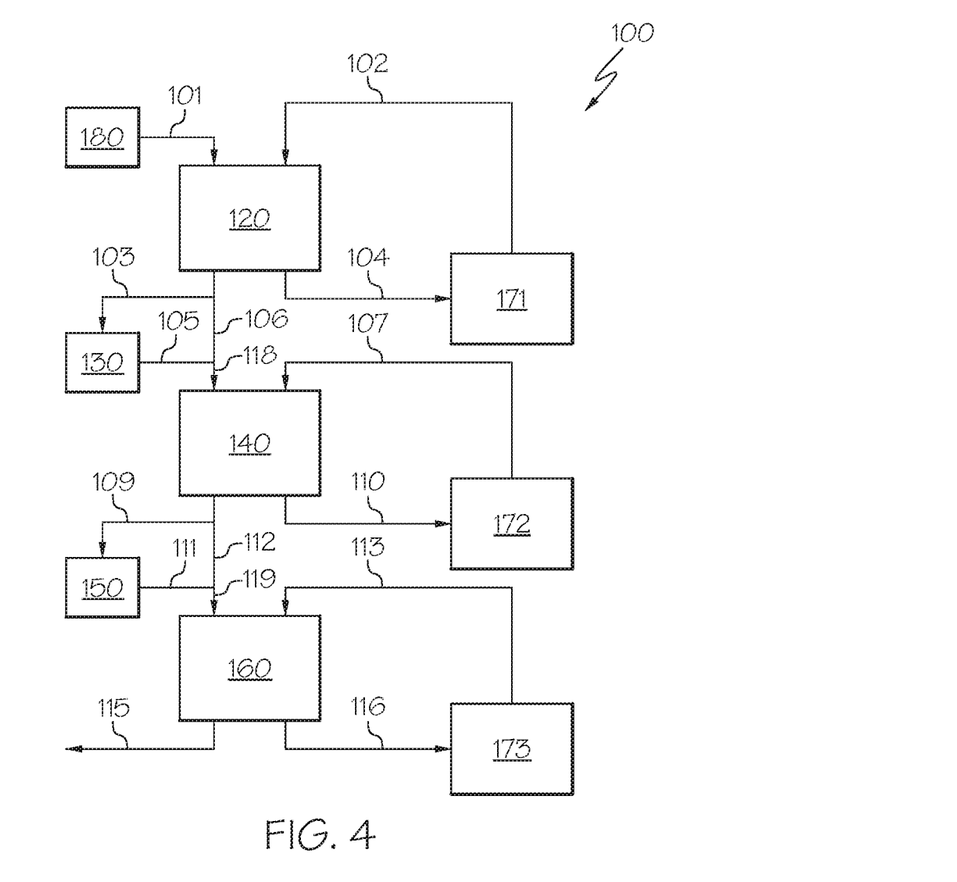
FIG. 4 depicts a generalized schematic diagram of another embodiment of a catalytic reforming system, according to one or more embodiments described in this disclosure.

Referring now to FIG. 4, the catalytic conversion system 100 is depicted in which the used catalyst produced in each reforming unit is regenerated in a different catalyst regenerator. In the catalytic reforming system 100 depicted in FIG. 4, the used first catalyst 104 produced in the first reforming unit 120 may be passed to a first catalyst regenerator 171. The first catalyst regenerator 171 may be operable to regenerate the used first catalyst 104 to produce regenerated catalyst, which is then passed back to the first reforming unit 120 as the first catalyst 102. The used second catalyst 110 produced in the second reforming unit 140 may be passed to a second catalyst regenerator 172. The second catalyst regenerator 172 may be operable to regenerate the used second catalyst 110 to produce regenerated catalyst, which is then passed back to the second reforming unit 140 as the second catalyst 107. The used third catalyst 116 produced in the third reforming unit 160 may be passed to a third catalyst regenerator 173. The third catalyst regenerator 173 may be operable to regenerate the used third catalyst 116 to produce regenerated catalyst, which is then passed back to the third reforming unit 160 as the third catalyst 113. When separate catalyst regenerators are used, the catalysts used in the reforming units 120, 140, 160 may be different. The separate catalyst regenerators may allow each catalyst to be regenerated and heated to different temperatures. The separate catalyst regenerators may also allow different catalysts to be used in each reforming unit. This may allow for different catalytic reactions to be promoted in different reforming units. For example, the first catalyst 102 may require greater operational temperatures and promote dehydrogenation of naphthenes while the second catalyst may have sufficient catalytic activity at reduced temperatures and promote the dehydrocyclization of paraffins, and while third catalyst may be designed to reform the refractory parrafinic compounds. This may allow the catalytic reforming system to be tailored to the specific requirements of a given hydrocarbon feedstock 101 composition.

Figure 5:
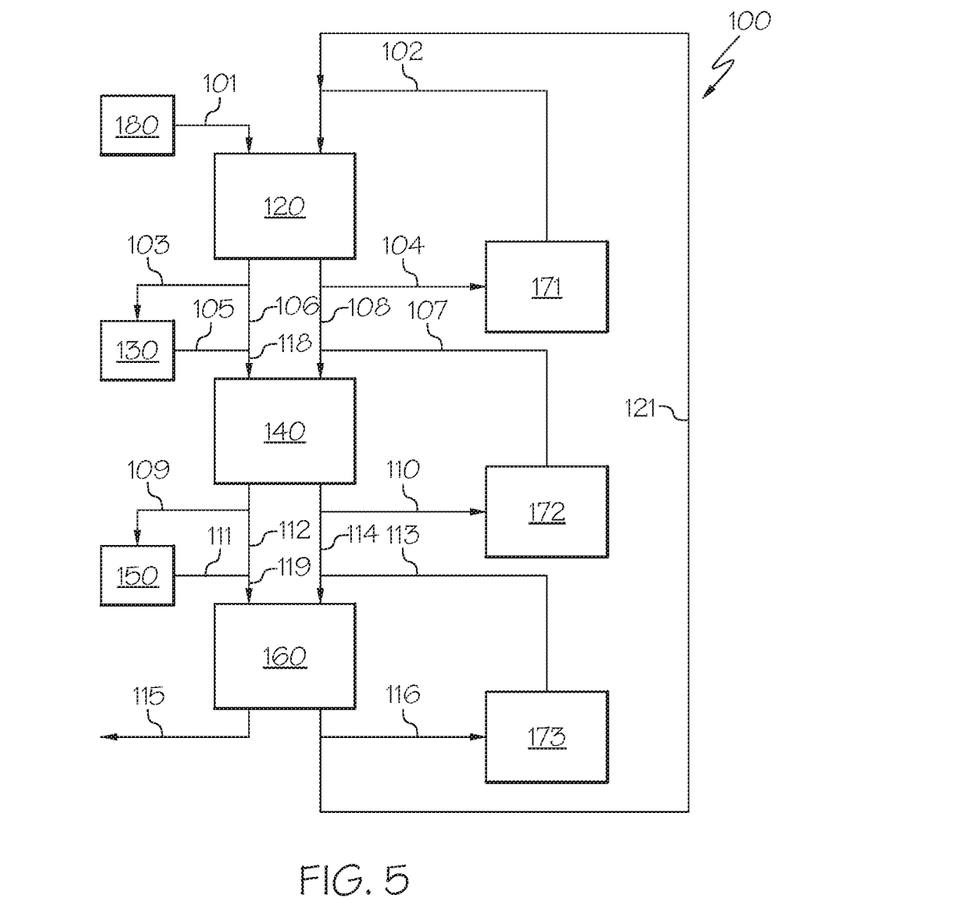
FIG. 5 depicts a generalized schematic diagram of another embodiment of a catalytic reforming system, according to one or more embodiments described in this disclosure.

Referring now to FIG. 5, the catalytic conversion system 100 is depicted in which at least a portion of the used catalyst produced in each reforming unit may be passed directly to the next reforming unit in series without regeneration, and a second portion of the used catalyst produced in each reforming unit is regenerated in a different catalyst regenerator. In the catalytic reforming system 100 depicted in FIG. 5, a first portion of the used first catalyst 104 produced in the first reforming unit 120 may be passed to a first catalyst regenerator 171, as described previously with respect to the catalytic reforming system 100 depicted in FIG. 4, and a second portion 108 of the used first catalyst may be passed directly to the second reforming unit 140. A first portion of the used second catalyst 110 produced in the second reforming unit 140 may be passed to a second catalyst regenerator 172 and a second portion 114 of the used second catalyst 110 may be passed directly to the third reforming unit 160. The used third catalyst 116 produced in the third reforming unit 160 may be passed to a third catalyst regenerator 173. The operation temperatures of the first catalyst regenerator 171, the second catalyst regenerator 172, and the third catalyst regenerator 173 may be different. The separate catalyst regenerators may allow the catalyst of each reforming unit to be regenerated and heated to different temperatures. This may allow for different catalytic reactions to be promoted in different reforming units while also utilizing the same catalyst composition in each reforming unit. For example, the first catalyst 102 may comprise a catalyst composition that promotes dehydrogenation of naphthenes at greater operational temperatures while the second catalyst 107 comprises the same catalyst composition at a reduced temperature, which promotes the dehydrocyclization of paraffins. Similarly, the third catalyst 113 may also comprise the same catalyst composition as the first catalyst 102 and the second catalyst 107, but promote the reform of refractory paraffinic compounds due to the use of a different operational temperature. This may allow the catalytic reforming system to be tailored to the specific requirements of a given hydrocarbon feedstock 101 composition. As shown in FIG. 5, a portion of the used third catalyst 121 produced in the third reforming unit 160 may be passed back to the first reforming unit 120. That is, the first catalyst 102 may include fresh catalyst, as described previously in the present disclosure, regenerated catalyst produced in the first catalyst regenerator 171, a portion of the used third catalyst 121 produced in the third reforming unit 160, or combinations or these.

As discussed previously in the present disclosure, the catalytic reactions that occur during reforming may be endothermic in nature. As such, the temperatures inside the reforming units 120, 140, 160 are not fixed. Instead, the temperature of the catalytic reforming system 100 may be monitored by internal sensing elements or by the temperature of the streams, as determined by the inlet temperatures of the reforming units 120, 140, 160. In this regard, the average operating temperature of the catalytic reforming system 100 may be reported as the weight average inlet temperature (WAIT). As used in the present disclosure, the term "weight average inlet temperature" may refer to the sum of the products of the inlet temperature for each reforming unit 120, 140, 160 and the weight of catalyst in that reforming unit, where the weight of catalyst in that reforming unit is expressed as a weight fraction of the total weight of catalyst in all of the reactors. The weight average inlet temperature of the catalytic reforming system 100 may be from 500° C. to 560° C. For example, the weight average inlet temperature of the catalytic reforming system 100 may be from 500° C. to 545° C., from 500° C. to 530° C., from 500° C. to 515° C., from 515° C. to 560° C., from 515° C. to 545° C., from 515° C. to 530° C., from 530° C. to 560° C., from 530° C. to 545° C., or from 545° C. to 560° C.

In a first aspect of the present disclosure, a process for catalytic reforming of a hydrocarbon feedstock comprises contacting the hydrocarbon feedstock with a first catalyst in a first reforming unit, the contacting causing reaction of at least a portion of the hydrocarbon feedstock to produce a first reforming effluent and a used first catalyst; passing a first portion of the first reforming effluent directly to a second reforming unit; contacting the first portion of the first reforming effluent with a second catalyst, the contacting causing reaction of at least a portion of the first reforming effluent to produce a second reforming effluent and a used second catalyst; passing a first portion of the second reforming effluent directly to a third reforming unit; contacting the first portion of the second reforming effluent with a third catalyst, the contacting causing reaction of at least a portion of the second reforming effluent to produce a reformate effluent and a used third catalyst; and regenerating at least a first portion of the used first catalyst, at least a first portion of the used second catalyst, and at least a first portion of the used third catalyst to produce a regenerated catalyst. The first catalyst, the second catalyst, and the third catalyst each comprise the regenerated catalyst.

A second aspect of the present disclosure may include the first aspect where the hydrocarbon feedstock comprises one or more of paraffins, naphthenes, aromatics, olefins, or combinations of these.

A third aspect of the present disclosure may include either of the first or second aspects where the hydrocarbon feed comprises a heavy naphtha stream.

A fourth aspect of the present disclosure may include any of the first through third aspects which further comprises heating a second portion of the first reforming effluent; and passing the second portion of the first reforming effluent to the second reforming unit.

A fifth aspect of the present disclosure may include any of the first through fourth aspects which further comprises heating a second portion of the second reforming effluent; and passing the second portion of the second reforming effluent to the third reforming unit.

A sixth aspect of the present disclosure may include any of the first through fifth aspects where the second catalyst further comprises a second portion of the used first catalyst that has not been regenerated.

A seventh aspect of the present disclosure may include the sixth aspect which further comprises passing the second portion of the used first catalyst directly to the second reforming unit without regenerating.

An eighth aspect of the present disclosure may include any of the first through seventh aspects where the third catalyst further comprises a second portion of the used second catalyst that has not been regenerated.

A ninth aspect of the present disclosure may include the eighth aspect which further comprises passing the second portion of the used second catalyst directly to the third reforming unit without regenerating.

A tenth aspect of the present disclosure may include any of the first through ninth aspects where regenerating comprises heating the used catalyst to a temperature of from 450° C. to 475° C.

An eleventh aspect of the present disclosure may include any of the first through tenth aspects where the first catalyst consists of regenerated catalyst, fresh catalyst, or combinations thereof.

A twelfth aspect of the present disclosure may include any of the first through eleventh aspects where the at least a first portion of the used first catalyst, the at least a first portion of the used second catalyst, and the at least a first portion of the used third catalyst are each regenerated in a separate catalyst regenerator.

A thirteenth aspect of the present disclosure may include any of the first through twelfth aspects where the first catalyst, the second catalyst, and the third catalyst each comprise a different reforming catalyst.

In a fourteenth aspect of the present disclosure, a process for catalytic reforming of a hydrocarbon feed stream comprises introducing the hydrocarbon feedstock to a first reforming unit operable to contact the hydrocarbon feedstock with a first catalyst, the contact causing reaction of at least a portion of the hydrocarbon feedstock to produce a first reforming effluent and a used first catalyst; passing a first portion of the first reforming effluent directly to a second reforming unit operable to contact the first portion of the first reforming effluent with a second catalyst, the contact causing reaction of at least a portion of the first reforming effluent to produce a second reforming effluent and a used second catalyst; passing a first portion of the second reforming effluent directly to a third reforming unit operable to contact the first portion of the second reforming effluent with a third catalyst, the contact causing reaction of at least a portion of the second reforming effluent to produce a reformate effluent and a used third catalyst; passing at least a portion of the used first catalyst, the used second catalyst, and the used third catalyst to at least one catalyst regenerator operable to regenerate the portions of the used first catalyst, the used second catalyst, and the used third catalyst to produce a regenerated catalyst; and recycling at least a portion of the regenerated catalyst to one or more of the first reforming unit, the second reforming unit, and the third reforming unit such that the first catalyst, the second catalyst, and the third catalyst each comprise at least a portion of the regenerated catalyst.

A fifteenth aspect of the present disclosure may include the fourteenth aspect where the hydrocarbon feedstock comprises one or more of paraffins, naphthenes, aromatics, olefins, or combinations of these.

A sixteenth aspect of the present disclosure may include either the fourteenth or the fifteenth aspects where the hydrocarbon feed comprises a heavy naphtha stream.

A seventeenth aspect of the present disclosure may include any of the fourteenth through sixteenth aspects which further comprises passing a second portion of the first reforming effluent to a heating unit operable to heat the second portion of the first reforming effluent; and passing the second portion of the first reforming effluent from the heating unit to the second reforming unit.

An eighteenth aspect of the present disclosure may include any of the fourteenth through seventeenth aspects which further comprises passing a second portion of the second reforming effluent to a heating unit operable to heat the second portion of the second reforming effluent; and passing the second portion of the second reforming effluent from the heating unit to the third reforming unit.

A nineteenth aspect of the present disclosure may include any of the fourteenth through eighteenth aspects where the second catalyst further comprises a second portion of the used first catalyst that has not been regenerated.

A twentieth aspect of the present disclosure may include the nineteenth aspect which further comprises passing the second portion of the used first catalyst directly to the second reforming unit without regenerating.

A twenty-first aspect of the present disclosure may include any of the fourteenth through twentieth aspects where the third catalyst further comprises a second portion of the used second catalyst that has not been regenerated.

A twenty-second aspect of the present disclosure may include the twenty-first aspect which further comprises passing the second portion of the used second catalyst directly to the third reforming unit without regenerating.

A twenty-third aspect of the present disclosure may include any of the fourteenth through twenty-second aspects where the first catalyst consists of regenerated catalyst, fresh catalyst, or combinations thereof.

A twenty-fourth aspect of the present disclosure may include any of the fourteenth through twenty-third aspects where the at least a first portion of the used first catalyst, the at least a first portion of the used second catalyst, and the at least a first portion of the used third catalyst are each regenerated in a separate catalyst regenerator.

A twenty-fifth aspect of the present disclosure may include the twenty-fourth aspect which further comprises passing the first portion of the used first catalyst to a first catalyst regenerator operable to regenerate the a first portion of the used first catalyst to produce a regenerated first catalyst; and recycling at least the regenerated first catalyst to the first reforming unit such that the first catalyst comprises at least a portion of the regenerated first catalyst.

A twenty-sixth aspect of the present disclosure may include the twenty-fourth aspect which further comprises passing the first portion of the used second catalyst to a second catalyst regenerator operable to regenerate the first portion of the used second catalyst to produce a regenerated second catalyst; and recycling at least a portion of the regenerated second catalyst to the second reforming unit such that the second catalyst comprises at least the regenerated second catalyst.

A twenty-seventh aspect of the present disclosure may include the twenty-fourth aspect which further comprises passing the first portion of the used third catalyst to a third catalyst regenerator operable to regenerate the first portion of the used third catalyst to produce a regenerated third catalyst; and recycling at least a portion of the regenerated third catalyst to the third reforming unit such that the third catalyst comprises at least the regenerated third catalyst.

A twenty-eighth aspect of the present disclosure may include any of the fourteenth through twenty-seventh aspects where the first catalyst, the second catalyst, and the third catalyst each comprise a different reforming catalyst.

A twenty-ninth aspect of the present disclosure may include any of the fourteenth through twenty-eighth aspects where a weight average inlet temperature of the first reforming unit, the second reforming unit, the third reforming unit, or combinations of these is from 500 degrees Celsius (° C.) to 560° C.

It should be apparent to those skilled in the art that various modifications and variations can be made to the described embodiments without departing from the spirit and scope of the claimed subject matter. Thus, it is intended that the specification cover the modifications and variations of the various described embodiments provided such modifications and variations come within the scope of the appended claims and their equivalents.

It is noted that one or more of the following claims utilize the term "where" as a transitional phrase. For the purposes of defining the present disclosure, it is noted that this term is introduced in the claims as an open-ended transitional phrase that is used to introduce a recitation of a series of characteristics of the structure and should be interpreted in like manner as the more commonly used open-ended preamble term "comprising."

It should be understood that any two quantitative values assigned to a property may constitute a range of that property, and all combinations of ranges formed from all stated quantitative values of a given property are contemplated in this disclosure.

Having described the subject matter of the present disclosure in detail and by reference to specific embodiments, it is noted that the various details described in this disclosure should not be taken to imply that these details relate to elements that are essential components of the various embodiments described in this disclosure, even in cases where a particular element is illustrated in each of the drawings that accompany the present description. Rather, the claims appended hereto should be taken as the sole representation of the breadth of the present disclosure and the corresponding scope of the various embodiments described in this disclosure. Further, it will be apparent that modifications and variations are possible without departing from the scope of the appended claims.

What is claimed is:

1. A process for catalytic reforming of a hydrocarbon feedstock, the process comprising:
    contacting the hydrocarbon feedstock with a first catalyst in a first reforming unit, the contacting causing reaction of at least a portion of the hydrocarbon feedstock to produce a first reforming effluent and a used first catalyst;
    passing a first portion of the first reforming effluent directly to a second reforming unit;
    contacting the first portion of the first reforming effluent with a second catalyst, the contacting causing reaction of at least a portion of the first reforming effluent to produce a second reforming effluent and a used second catalyst;
    passing a first portion of the second reforming effluent directly to a third reforming unit;
    contacting the first portion of the second reforming effluent with a third catalyst, the contacting causing reaction of at least a portion of the second reforming effluent to produce a reformate effluent and a used third catalyst; and
    regenerating at least a first portion of the used first catalyst, at least a first portion of the used second catalyst, and at least a first portion of the used third catalyst to produce a regenerated catalyst,
    where the first catalyst, the second catalyst, and the third catalyst each comprise the regenerated catalyst.

2. The process of claim 1, where the hydrocarbon feedstock comprises one or more of paraffins, naphthenes, aromatics, olefins, or combinations of these.

3. The process of claim 1, where the hydrocarbon feed comprises a heavy naphtha stream.

4. The process of claim 1, further comprising:
    heating a second portion of the first reforming effluent; and
    passing the second portion of the first reforming effluent to the second reforming unit.

5. The process of claim 1, further comprising:
    heating a second portion of the second reforming effluent; and
    passing the second portion of the second reforming effluent to the third reforming unit.

6. The process of claim 1, where the second catalyst further comprises a second portion of the used first catalyst that has not been regenerated.

7. The process of claim 6, further comprising passing the second portion of the used first catalyst directly to the second reforming unit without regenerating.

8. The process of claim 1, where the third catalyst further comprises a second portion of the used second catalyst that has not been regenerated.

9. The process of claim 8, further comprising passing the second portion of the used second catalyst directly to the third reforming unit without regenerating.

10. The process of claim 1, where the at least a first portion of the used first catalyst, the at least a first portion of the used second catalyst, and the at least a first portion of the used third catalyst are each regenerated in a separate catalyst regenerator.

11. A process for catalytic reforming of a hydrocarbon feed stream, the process comprising:
    introducing the hydrocarbon feedstock to a first reforming unit operable to contact the hydrocarbon feedstock with a first catalyst, the contact causing reaction of at least a portion of the hydrocarbon feedstock to produce a first reforming effluent and a used first catalyst;
    passing a first portion of the first reforming effluent directly to a second reforming unit operable to contact the first portion of the first reforming effluent with a second catalyst, the contact causing reaction of at least a portion of the first reforming effluent to produce a second reforming effluent and a used second catalyst;
    passing a first portion of the second reforming effluent directly to a third reforming unit operable to contact the first portion of the second reforming effluent with a third catalyst, the contact causing reaction of at least a portion of the second reforming effluent to produce a reformate effluent and a used third catalyst;
    passing at least a portion of the used first catalyst, the used second catalyst, and the used third catalyst to at least one catalyst regenerator operable to regenerate the portions of the used first catalyst, the used second catalyst, and the used third catalyst to produce a regenerated catalyst; and
    recycling at least a portion of the regenerated catalyst to one or more of the first reforming unit, the second reforming unit, the third reforming unit, or combinations of these, such that the first catalyst, the second catalyst, and the third catalyst each comprise at least a portion of the regenerated catalyst.

12. The process of claim 11, further comprising:
    passing a second portion of the first reforming effluent to a heating unit to heat the second portion of the first reforming effluent; and
    passing the second portion of the first reforming effluent from the heating unit to the second reforming unit.

13. The process of claim 11, further comprising:
    passing a second portion of the second reforming effluent to a heating unit operable to heat the second portion of the second reforming effluent; and
    passing the second portion of the second reforming effluent from the heating unit to the third reforming unit.

14. The process of claim 11, where the second catalyst further comprises a second portion of the used first catalyst that has not been regenerated.

15. The process of claim 11, where the third catalyst further comprises a second portion of the used second catalyst that has not been regenerated.

16. The process of claim 11, where the at least a first portion of the used first catalyst, the at least a first portion of the used second catalyst, and the at least a first portion of the used third catalyst are each regenerated in a separate catalyst regenerator.

17. The process of claim 16, comprising:

passing the first portion of the used first catalyst to a first catalyst regenerator operable to regenerate the first portion of the used first catalyst to produce a regenerated first catalyst; and recycling at least a portion of the regenerated first catalyst to the first reforming unit such that the first catalyst comprises at least the regenerated first catalyst.

18. The process of claim 16, comprising:

passing the first portion of the used second catalyst to a second catalyst regenerator operable to regenerate the first portion of the used second catalyst to produce a regenerated second catalyst; and recycling at least a portion of the regenerated second catalyst to the second reforming unit such that the second catalyst comprises at least the regenerated second catalyst.

19. The process of claim 16, comprising:

passing the first portion of the used third catalyst to a third catalyst regenerator operable to regenerate the used third catalyst to produce a regenerated third catalyst; and recycling the regenerated third catalyst to the third reforming unit such that the third catalyst comprises the regenerated third catalyst.

20. The process of claim 14, where a weight average inlet temperature of the first reforming unit, the second reforming unit, the third reforming unit, or combinations of these is from 500 degrees Celsius (° C.) to 560° C.

* * * * *